Dec. 22, 1931. L. F. CARTER 1,837,609
GRADE INDICATOR
Filed Dec. 27, 1929 2 Sheets-Sheet 1

INVENTOR
LESLIE F. CARTER.
BY Herbert H. Thompson
his ATTORNEY.

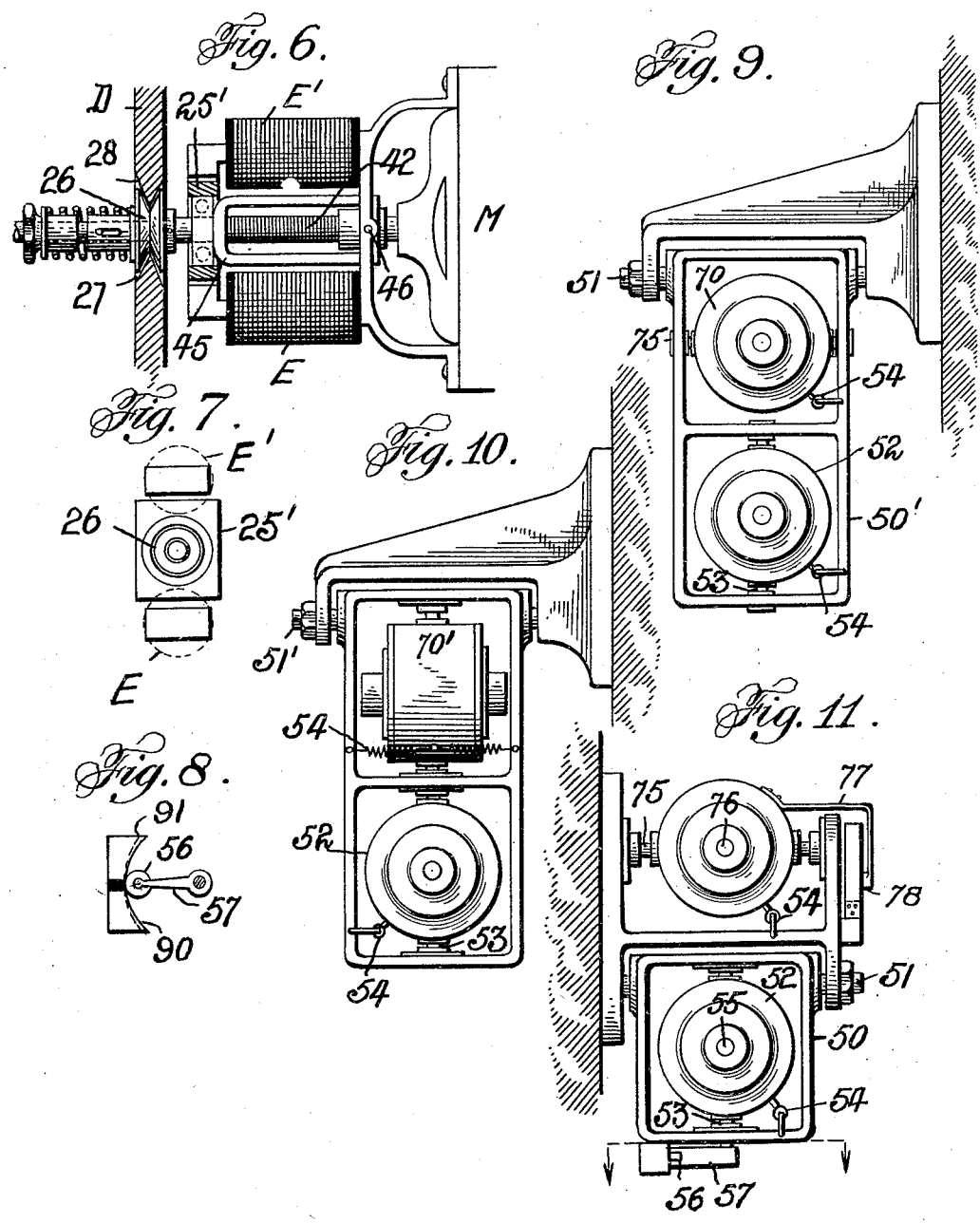

Patented Dec. 22, 1931

1,837,609

UNITED STATES PATENT OFFICE

LESLIE F. CARTER, OF LEONIA, NEW JERSEY, ASSIGNOR, BY MESNE ASSIGNMENTS, TO SPERRY PRODUCTS, INC., OF BROOKLYN, NEW YORK, A CORPORATION OF NEW YORK

GRADE INDICATOR

Application filed December 27, 1929. Serial No. 416,989.

This invention relates to means for establishing and maintaining a true vertical and is particularly adapted for indicating the grade in railway tracks or other roadways. Since changes in velocity in the direction of running of a vehicle, such as a railway car, are of less frequency than changes in cross level, I propose to use an ordinary pendulum in place of the gyro or gyro pendulum which has been found necessary in cross level indicating mechanisms.

Such a pendulum is incapable of actuating a recording pen and for this reason I propose to employ a novel follow-up mechanism to follow the apparent movements of the pendulum with respect to the vehicle and actuate the pen. The principal features of my novel follow-up mechanism are, first, that it acts instantly without lag or delay of any kind, and secondly, that it can supply unlimited power for whatever functions it is to perform.

I propose to suspend an ordinary pendulum for movement in a longitudinal plane in relation to the direction of travel of the vehicle on which it is mounted, and while changes in acceleration in this direction are not frequent they will introduce errors into the position of the pendulum and hence into the indication made by the recording pen when such change in acceleration does occur. For this purpose I provide an acceleration responsive means in addition to the pendulum and cause said acceleration responsive means to render the follow-up mechanism ineffective during the interval that such acceleration is changing and, therefore, maintain the recording pen unaffected by such change in acceleration.

In another form of my invention I may combine the ordinary pendulum with the additional acceleration responsive means, said means taking the form of a gyro suitably mounted within the pendulum so that it will precess upon variations in acceleration. I then provide means whereby the precession of said gyro controls the follow-up mechanism.

Since the pendulum is mounted for movement in a longitudinal plane with respect to the direction of travel of the vehicle, that is, it is mounted upon a lateral axis at right angles to the direction of travel, said pendulum would ordinarily not be affected by turning of the craft. If, however, the vehicle comes to rest on a banked curve, or the rate of travel over such a banked curve is less than the designed speed, it would cause a deflection of the pendulum from its true position owing to the gravity component acting upon the inclined pivotal axis of the pendulum and cause an incorrect indication to be given by the recording mechanism. I may, therefore, provide means responsive to turning in azimuth for preventing actuation of the recording mechanism while such turning takes place. Means are provided whereby the said turn responsive means controls the actuation of the follow-up mechanism.

I may, if desired, combine the additional acceleration responsive means and the turn responsive means in a single form of the invention and cause the actuation of either one or both of these responsive means to render the follow-up mechanism ineffective.

In another modification of my invention I may mount the acceleration responsive means and the turn responsive means within an ordinary pendulum pivoted for movement in a longitudinal plane relative to the direction of travel of the vehicle.

Further objects and advantages of this invention will become apparent in the following detailed description thereof.

In the accompanying drawings,

Fig. 6 is a section through a modified form of follow-up direction controlling means.

Fig. 7 is an end view of the direction controlling means of Fig. 6.

Fig. 8 is a plan view of a trolley and contact system disclosing a means whereby a centralizing effect is obtained without the use of springs.

Fig. 9 is a modified form of my invention in which both acceleration responsive and turn responsive mechanisms are mounted in a pendulous frame to control the follow-up mechanism.

Fig. 10 is a view similar to Fig. 9 but showing one of the mechanisms positioned in the pendulous frame at a different angle.

Fig. 11 shows still another modification of my invention wherein the acceleration responsive means alone is mounted in a pendulous frame.

Figure 1:
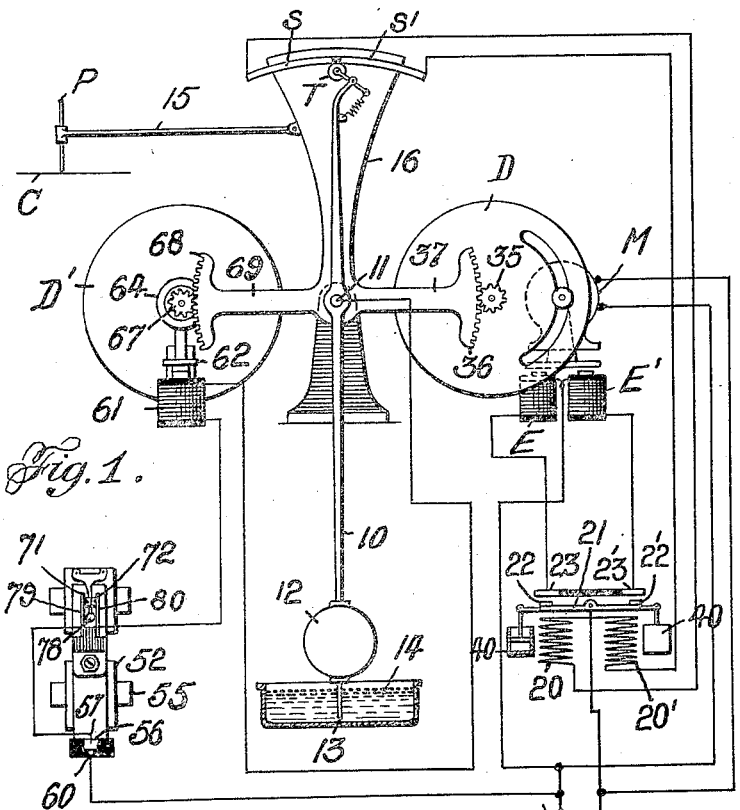
Fig. 1 is an assembly view, largely diagrammatic, showing one form of my grade or inclination recording device with acceleration and turn responsive controlling means for the follow-up system.

Referring to Fig. 1 of the drawings, the principles of my invention are embodied in this form. There is disclosed here an ordinary pendulum 10 pivoted on an axis 11 to swing in the plane of the paper, which is the longitudinal direction of travel of the vehicle upon which the device is mounted. The pendulum bob 12 is supplied with a damping member 13 operating in a viscous fluid 14 for damping the quick oscillations set up in the device. The recording mechanism for indicating the changes in grade or inclination is shown very diagrammatically as comprising the pen P operating on a chart C through the medium of a linkage 15 pivoted to a member 16 which may be mounted upon the same axis 11 as the pendulum. The means whereby the pen P is actuated in response to the movements of the pendulum 10, and to the same proportionate degree, comprises the following mechanism: The pendulum 10 carries a trolley T which operates with respect to contact segments S—S' to control the energization of a follow-up mechanism. The trolley T normally rests in engagement with both segments S—S' to maintain both coils 20—20' of a relay energized so that the armature 21 thereof is maintained in neutral position out of engagement with either coil and hence maintains its contacts 22—22' out of engagement with contacts 23—23'. When, however, there is inclination of the vehicle with movement of the pendulum relative to the vehicle, trolley T engages segment S or segment S' to maintain one coil 20 or 20' energized while deenergizing of the other coil so that armature 21 is rocked about its pivot to cause the proper set of contacts 22—23 or 22'—23' to be engaged and thus energize magnet E or E'. The energization of one or the other of magnets E or E' will rock an armature 25 about its pivot against the action of centralizing spring 29 to move a roller 26, carried by motor M, into engagement with one side 27 or the other side 28 of a circumferential slot 30 formed in a disc D which is mounted for rotation about an axis 31. It will be seen from the wiring diagram that motor M operates continuously in one direction and that engagement of roller 26 with edge 27 will rotate disc D in one direction while engagement of said roller with edge 28 will rotate the disc D in the opposite direction. The continuously operating motor insures instant response of the follow-up mechanism and avoids the time lag which has heretofore been present in the case of reversible motors due to the time which it takes to build up the current and the speed in a reversible motor. Since the roller 26 is of small circumference with respect to the circumference of slot 30, there is established in effect a reduction gearing between the motor M and the disc D. The said disc carries a pinion 35 on its axis of rotation which meshes with a segmental rack 36 formed on an arm 37 carried by the member 16 which is connected to the pen P. It will be understood that the wiring is such that the member 16 will be operated in such direction as to cause the contact segments S—S' to follow the movements of trolley T until said trolley again rests on both segments by spanning the space between them and thus deenergizes magnet E or E' to permit centralizing spring 24 to restore the roller 26 to its mid position within slot 30 and out of engagement with either edge 27 or 28.

The relay 20—20' is of the delayed-action type in order to avoid operating the follow-up system, and hence the recording mechanism with every slight forward or backward jerking action of the vehicle with its momentary disturbing influence upon the pendulum. For this purpose the armature 21 operates in connection with dash pots 40 at either side of its pivot.

Figures 4, 5:
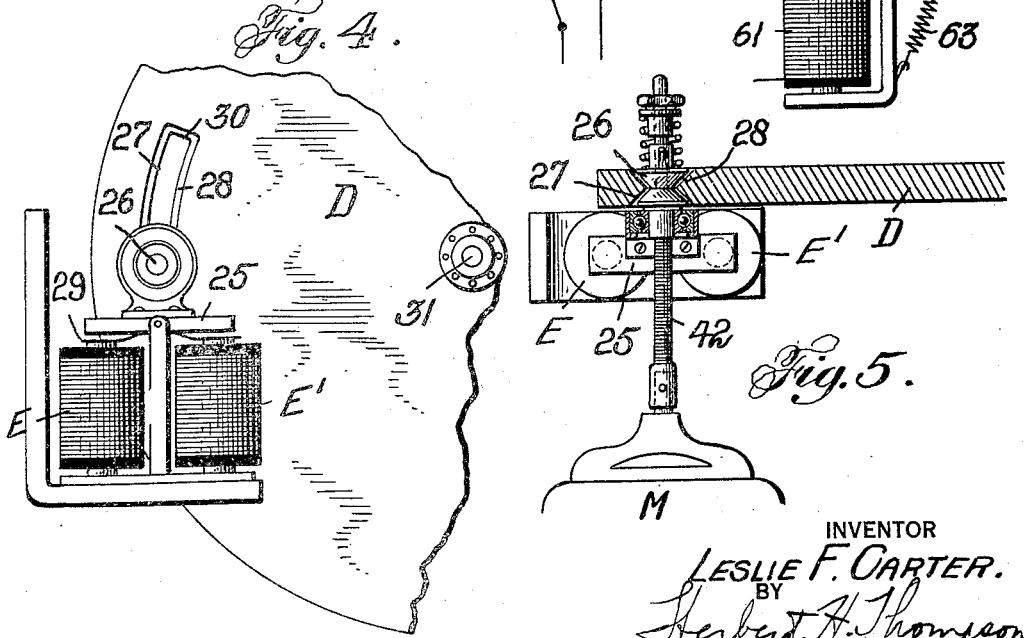
Fig. 4 is an enlarged front view of the follow-up drive.
Fig. 5 is a horizontal section through the follow-up drive of Fig. 4.

Referring to Fig. 5, there is disclosed in detail the novel follow-up drive from motor M to disc D. It will be seen that there is a flexible drive shaft 42 between the motor M and the roller 26 to permit said roller to be deflected to one side or the other of slot 30. The edges 27—28 of slot 30 are shown as wedge shaped and the roller as correspondingly grooved for engagement with the driving edges.

In Fig. 6 there is disclosed a slightly modified form of drive between motor M and disc D, the modification comprising the substitution of a different type of armature for armature 25 of Fig. 4 which carries the pulley 26. In this form the magnets E—E' attract an armature 25' which is mounted on a frame 45 pivoted at 46, the flexible shaft 42 from motor M to the pulley 26 extending through said frame 45. The entire frame including the armature 25' and the roller 26 is swung about pivot 46 when magnet E or E' is energized.

Figure 3:
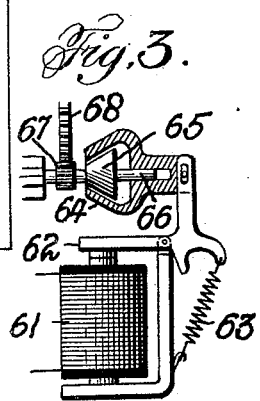
Fig. 3 is a detailed view partly sectioned vertically disclosing the form of brake or locking mechanism for maintaining the recording mechanism fixed in position while the follow-up mechanism is rendered ineffective.

As fully set forth in the introductory remarks to this specification, it may be desired to prevent operation of the recording mechanism when there is prolonged acceleration or deceleration which would tend to throw the pendulum 10 in one direction or the other in response to such acceleration or deceleration and thus introduce an error into the record of inclination or grade. For this purpose I may provide the mechanism disclosed in Fig. 11 and which comprises essentially a pendulum 50 pivoted about an axis 51 so that the plane of oscillation of said pendulum would normally be the same as that of pendulum 10, and within said pendulum frame 50 I mount a gyro 52 in a case which is pivoted for rotation about a vertical axis 53. Centralizing springs 54 normally maintain said gyro case so that the spinning axis 55 of the gyro is longitudinally of the vehicle, that is, in the direction of travel. Upon prolonged acceleration or deceleration the gyro would tend to place itself in the plane of the applied force, that is, it would tend to rotate until the casing 52 were in the longitudinal plane. Such rotation about axis 53 in response to change of rate of travel is caused to operate a trolley 56 carried by an arm 57 movable with the gyro casing to move said trolley off a live segment 60. This serves to deenergize a magnet 61 (see Fig. 3) which releases its armature 62 and permits a spring 63 to actuate clutch member 64 into engagement with clutch member 65. Said clutch member 65 is mounted upon a shaft 66 carrying a pinion 67 meshing with a segmental gear 68 on an arm 69 carried by member 16. It will thus be seen that when change of rate of travel is present, the gyro 52 tends to precess about axis 53 to carry trolley 56 out of engagement with contact segment 60 to deenergize magnet 61 and thus lock member 16 and the recording mechanism in position by means of the brake or clutch 64—65. An inertia disc D' may be mounted on shaft 66. The discs D and D' will serve to prevent hunting of the device when the pen P is lifted off the chart.

Also as hereinbefore explained it may be desirable to prevent actuation of the recording mechanism while turning in azimuth takes place, because if such turn occurs at a time when the vehicle is tilted, a movement will be imparted to the pendulum 10 which will cause the follow-up mechanism to actuate the recording mechanism and thus record an incorrect indication of grade or inclination. I, therefore, provide means whereby the said brake or locking mechanism hereinbefore described may be controlled not only by the acceleration responsive gyro 52 but also by a turn responsive gyro 70 (see Figs. 1 and 11), by having the circuit through magnet 61 extend not only through contacts 56—60 but also through a pair of contacts 71—72 normally in contact but adapted to be opened during turning of the craft. For opening said contacts 71—72 when turning in azimuth occurs I may cause the gyro 70, which is mounted upon a horizontal axis 75, to rotate about said axis to tend to place its axis 76 in line with the axis of turning of the vehicle. This will cause an arm 77 carrying a pulley 78 at its lower end to spread one or the other of the spring contact arms 79—80 carrying the contacts 71—72 respectively to break engagement between said contacts whenever gyro 70 precesses about axis 75 in response to turning of the vehicle in azimuth. By referring to Fig. 1, it will be seen that since the circuit through magnet 61 lies through contacts 56—60 and 71—72, breaking of either set of contacts will cause the brake or lock to be rendered effective to hold the recording mechanism against actuation.

Figure 2:
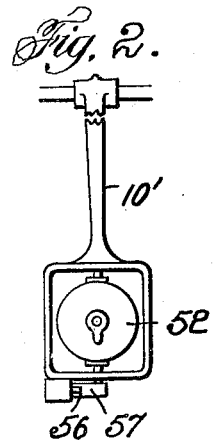
Fig. 2 is a front view of a modified form of pendulum which combines an ordinary pendulum with the acceleration responsive means.

By referring to Fig. 2, it will be seen that I have disclosed a modified form of my invention in which the pendulum 10 has been replaced by a pendulum 10' which carries the acceleration responsive gyro 52 mounted therein. The action is exactly the same as before except that the pendulum will be more strongly stabilized against displacement. If desired, a separate turn responsive gyro 70 may be employed disconnected from the pendulum.

In the Fig. 9 modification of the Figs. 1 and 11 form, I may mount both the turn responsive gyro 70 and the acceleration responsive gyro 52 within a single frame 50' pendulously mounted at 51'. Said frame 50' will, of course, be stabilized against displacement, any tendency to displace the same being counteracted by the precessional movements of the gyros about their axes.

In Fig. 10 there is disclosed a slight modification of the Fig. 9 form of the invention wherein the turn responsive gyro 70' is positioned at right angles to that shown in Fig. 9. This positioning is found to be more readily responsive to banking of the vehicle which always accompanies turning.

In the various forms of the invention hereinbefore described, frequent use is made of centralizing springs between the gyroscopes and their frames. It is undesirable, however, to apply substantial torques to the gyros through the centralizing springs, and I may, therefore, utilize the trolley and contact segments circuit-controller for applying the necessary centralizing effort to the gyros. For this purpose the contact segments may be formed in an arc of somewhat greater curvature (as shown in full lines at 90 in Fig. 8) than the arc of a true circle (as shown in dotted lines at 91) described by the trolley. This results in a wedging action as the trolley moves outwardly on the segments, and there is thus created the necessary force for returning the trolley to centralized position.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a grade or inclination indicator adapted to be mounted on a vehicle, a pendulum, a recording mechanism and follow-up mechanism for following the movements of said pendulum relative to said vehicle, said follow-up mechanism including a continuously operating motor, and means whereby said motor is connected to said recording mechanism upon relative movement between said vehicle and said pendulum.

2. In a grade or inclination indicator adapted to be mounted on a vehicle, a pendulum, a recording mechanism and follow-up mechanism for following the movements of said pendulum relative to said vehicle, said follow-up mechanism including a continuously operating motor, a rotatable member operatively connected to said recording mechanism and having a circumferential slot therein, and means for connecting said motor to one side or the other of said slot.

3. In a grade or inclination indicator adapted to be mounted on a vehicle, a pendulum, a recording mechanism and follow-up mechanism for following the movements of said pendulum relative to said vehicle, said follow-up mechanism including a continuously operating motor, a rotatable member operatively connected to said recording mechanism and having a circumferential slot therein, a gear driven by said motor, and means controlled by the direction of relative movement between said pendulum and said vehicle for engaging said gear with one side or the other of said slot.

4. In a grade or inclination indicator adapted to be mounted on a vehicle, a pendulum, a recording mechanism and follow-up mechanism for following the movements of said pendulum relative to said vehicle, said follow-up mechanism including a continuously operating motor, a rotatable member operatively connected to said recording mechanism and having a circumferential slot therein, a gear flexibly connected to said motor, and means controlled by the direction of relative movement between said pendulum and said vehicle for engaging said gear with one side or the other of said slot.

5. In a grade or inclination indicator adapted to be mounted on a vehicle, a pendulum, a recording mechanism and follow-up mechanism for following the movements of said pendulum relative to said vehicle, said follow-up mechanism including a continuously operating motor, a rotatable member operatively connected to said recording mechanism and having a circumferential slot therein, a gear flexibly connected to said motor, an oscillatable support for said gear, means normally centralizing said support to maintain said gear out of contact with the sides of said slot, and means controlled by the direction of relative movement between said pendulum and said vehicle for oscillating said support to cause said gear to engage one side or the other of said slot.

6. In a grade or inclination indicator adapted to be mounted on a vehicle, a pendulum, a recording mechanism and follow-up mechanism for following the movements of said pendulum relative to said vehicle, said follow-up mechanism including a continuously operating motor, a rotatable member operatively connected to said recording mechanism and having a circumferential slot therein, a gear flexibly connected to said motor, and means controlled by the direction of relative movement between said pendulum and said vehicle for engaging said gear with one side or the other of said slot, said last-named means comprising cooperating electric contacts between said trolley and said vehicle, a plurality of electro-magnetic means selectively controlled by said contacts, and a pivoted armature supporting said gear and cooperating with said electro-magnetic means.

7. In a grade or inclination indicator adapted to be mounted on a vehicle, a pendulum, a recording mechanism and follow-up mechanism for following the movements of said pendulum relative to said vehicle, said follow-up mechanism including a continuously operating motor, a rotatable member operatively connected to said recording mechanism and having a circumferential slot therein, a gear flexibly connected to said motor, and means controlled by the direction of relative movement between said pendulum and said vehicle for engaging said gear with one side or the other of said slot, said last-named means comprising cooperating electric contacts between said trolley and said vehicle, a plurality of electro-magnetic means, means including a delayed action relay whereby said contacts selectively control said electro-magnetic means, and a pivoted armature supporting said gear and cooperating with said electro-magnetic means.

8. In a grade or inclination indicator adapted to be mounted on a vehicle, a pendulum, a recording mechanism and follow-up mechanism for following the movements of said pendulum relative to said vehicle, said follow-up mechanism including a continuously operating motor, a rotatable member operatively connected to said recording mechanism and having a circumferential slot therein, a gear flexibly connected to said motor, and means controlled by the direction of relative movement between said pendulum and said vehicle for engaging said gear with one side or the other of said slot, said last-named means comprising cooperating electric contacts between said trolley and said vehicle, a plurality of electro-magnetic means, means including a delayed action relay whereby said contacts selectively control said electro-magnetic means, a pivoted armature supporting said gear and cooperating with said electro-magnetic means, and means normally centralizing said armature for maintaining said gear out of contact with the side of said slot.

9. In a grade or inclination indicator adapted to be mounted on a vehicle, a pendulum, a recording mechanism, means responsive to relative movement between the pendulum and the vehicle for actuating said recording mechanism, and means responsive to acceleration forces in the plane of oscillation of said pendulum for locking said recording means against actuation.

10. In a grade or inclination indicator adapted to be mounted on a vehicle, a pendulum, a recording mechanism, means responsive to relative movement between the pendulum and the vehicle for actuating said recording mechanism, means for locking said mechanism against actuation, a gyroscope mounted to precess in response to acceleration forces in the plane of oscillation of said pendulum, and means whereby the precession of said gyroscope renders said locking means effective.

11. In a grade or inclination indicator adapted to be mounted on a vehicle, a pendulum, a recording mechanism, means responsive to relative movement between the pendulum and the vehicle for actuating said recording mechanism, means for locking said mechanism against actuation, a pendulous frame mounted for oscillation in a plane parallel to said simple pendulum, a gyroscope mounted in said frame for precession in response to said oscillations, and means whereby the precession of said gyroscope renders said locking means effective.

12. In a grade or inclination indicator adapted to be mounted on a vehicle, a pendulum, a recording mechanism, means responsive to relative movement between the pendulum and the vehicle for actuating said recording mechanism, means for locking said mechanism against actuation, a gyroscope mounted to precess in response to turning of the vehicle in azimuth, and means whereby the precession of said gyroscope renders said locking means effective.

13. In a grade or inclination indicator adapted to be mounted on a vehicle, a pendulum, a recording mechanism, means responsive to relative movement between the pendulum and the vehicle for actuating said recording mechanism, means for locking said mechanism against actuation, a gyroscope mounted to precess in response to acceleration forces in the plane of oscillation of said pendulum, a second gyroscope mounted to precess in response to turning of the vehicle in azimuth, and means whereby the precession of one or both of said gyroscopes renders said locking means effective.

14. In a grade or inclination indicator adapted to be mounted on a vehicle, a pendulum, a recording mechanism, means responsive to relative movement between the pendulum and the vehicle for actuating said recording mechanism, means for locking said mechanism against actuation, a pendulous frame mounted for oscillation in a plane parallel to said simple pendulum, a gyroscope mounted in said frame to precess in response to acceleration forces in the plane of oscillation of said pendulum, a second gyroscope mounted in said frame to precess in response to turning of the vehicle in azimuth, and means whereby the precession of one or both of said gyroscopes renders said locking means effective.

15. In a grade or inclination indicator adapted to be mounted on a vehicle, a pendulum, a recording mechanism, means responsive to relative movement between the pendulum and the vehicle for actuating said recording mechanism, means for locking said mechanism against actuation, a gyroscope mounted in said pendulum to precess in response to acceleration forces in the plane of oscillation of said pendulum, and means whereby the precession of said gyroscope renders said locking means effective.

16. In a device of the class described, a self-centralizing electric contact system comprising a trolley rotatable in the arc of a circle, cooperating spaced contact segments on which said trolley operates, said segments forming a curve of lesser radius than the arc described by said trolley and internally tangent to said arc at a point occupied by said space between the contacts.

17. A speed responsive device adapted to be mounted on a vehicle and comprising a pendulous frame mounted for movement in the plane of travel of the vehicle and a gyroscope mounted in said frame for precession in response to the action of acceleration forces in the line of movement of said vehicle.

18. A combined speed and turn responsive device adapted to be mounted on a vehicle and comprising a pendulous frame mounted for movement in the plane of travel of the vehicle, gyroscopic means mounted so as to be responsive to turning of the vehicle in azimuth, and a gyroscope mounted in said frame for precession in response to the action of acceleration forces in the line of movement of said vehicle.

19. A combined speed and turn responsive device adapted to be mounted on a vehicle and comprising a pendulous frame mounted for movement in the plane of travel of the vehicle, a gyroscope mounted in said frame so as to be responsive to turning of the vehicle in azimuth, and a gyroscope mounted in said frame for precession in response to the action of acceleration forces in the line of movement of said vehicle.

In testimony whereof I have affixed my signature.

LESLIE F. CARTER.